United States Patent
Jeong et al.

(10) Patent No.: US 10,229,687 B2
(45) Date of Patent: Mar. 12, 2019

(54) SCALABLE ENDPOINT-DEPENDENT NATURAL LANGUAGE UNDERSTANDING

(71) Applicant: Microsoft Technology Licensing, LLC, Redmond, WA (US)

(72) Inventors: Minwoo Jeong, Sammamish, WA (US); Ruhi Sarikaya, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 62 days.

(21) Appl. No.: 15/067,082

(22) Filed: Mar. 10, 2016

(65) Prior Publication Data

US 2017/0263255 A1    Sep. 14, 2017

(51) Int. Cl.
*G10L 15/00* (2013.01)
*G10L 15/30* (2013.01)
(Continued)

(52) U.S. Cl.
CPC ............ *G10L 15/30* (2013.01); *G06F 17/279* (2013.01); *G06F 17/30634* (2013.01); *G06F 17/30976* (2013.01); *G10L 15/183* (2013.01)

(58) Field of Classification Search
CPC ...................................................... G10L 15/00
(Continued)

(56) References Cited

U.S. PATENT DOCUMENTS

| | | | | |
|---|---|---|---|---|
| 4,615,002 A | * | 9/1986 | Innes ..................... | G06F 9/454 704/8 |
| 5,729,659 A | * | 3/1998 | Potter ................... | G10L 15/193 704/257 |

(Continued)

FOREIGN PATENT DOCUMENTS

| | | |
|---|---|---|
| CN | 105487663 A | 4/2016 |
| WO | 2011/088053 A2 | 7/2011 |

(Continued)

OTHER PUBLICATIONS

Khan, et al., "Hypotheses Ranking and State Tracking for a Multi-Domain Dialog System using Multiple Alternates," in Proceedings of the 16th Annual Conference of the International Speech Communication Association, Sep. 2015, 5 pages.

Liu, et al., "Natural Language Understanding for Partial Queries," in IEEE Automatic Speech Recognition and Understanding Workshop, ASRU 2015, Dec. 2015, 4 pages.

(Continued)

*Primary Examiner* — Michael C Colucci
(74) *Attorney, Agent, or Firm* — Rainier Patents, P.S.

(57) ABSTRACT

A computer-implemented technique is described for processing a linguistic item (e.g., a query) in an efficient and scalable manner. The technique interprets the linguistic item using a language understanding (LU) system in a manner that is based on a particular endpoint mechanism from which the linguistic item originated. The LU system may include an endpoint-independent subsystem, an endpoint-dependent subsystem, and a ranking component. The endpoint-independent subsystem interprets the linguistic item in a manner that is independent of the particular endpoint mechanism. The endpoint-dependent subsystem interprets the linguistic item in a manner that is dependent on the particular endpoint mechanism. The ranking component generates final interpretation results based on intermediate results generated by the endpoint-independent subsystem and the endpoint-dependent subsystem, e.g., by identifying the most likely interpretation of the linguistic item.

20 Claims, 8 Drawing Sheets

(51) Int. Cl.
*G06F 17/30* (2006.01)
*G10L 15/183* (2013.01)
*G06F 17/27* (2006.01)

(58) Field of Classification Search
USPC .............. 704/257, 208, 235, 244; 709/223
See application file for complete search history.

(56) References Cited

U.S. PATENT DOCUMENTS

| | | | |
|---|---|---|---|
| 7,158,934 B2* | 1/2007 | Honda | G10L 15/075 704/244 |
| 7,299,181 B2* | 11/2007 | Ju | G10L 15/06 704/257 |
| 7,809,574 B2* | 10/2010 | Roth | G10L 15/14 704/270 |
| 8,326,637 B2 | 12/2012 | Baldwin et al. | |
| 2002/0193989 A1* | 12/2002 | Geilhufe | G10L 15/26 704/208 |
| 2005/0049880 A1* | 3/2005 | Roth | G10L 15/19 704/277 |
| 2005/0273336 A1* | 12/2005 | Chang | G06F 8/315 704/257 |
| 2006/0271351 A1 | 11/2006 | Cavedon et al. | |
| 2011/0010174 A1* | 1/2011 | Longe | G10L 15/24 704/235 |
| 2011/0060587 A1* | 3/2011 | Phillips | G10L 15/30 704/235 |
| 2012/0016678 A1 | 1/2012 | Gruber et al. | |
| 2012/0035924 A1* | 2/2012 | Jitkoff | G01C 21/3608 704/235 |
| 2012/0296638 A1 | 11/2012 | Patwa | |
| 2013/0060571 A1* | 3/2013 | Soemo | G10L 15/30 704/251 |
| 2014/0095147 A1 | 4/2014 | Hebert et al. | |
| 2014/0136183 A1 | 5/2014 | Hebert et al. | |
| 2014/0163959 A1 | 6/2014 | Hebert et al. | |
| 2014/0172953 A1 | 6/2014 | Blanksteen | |
| 2014/0358545 A1 | 12/2014 | Robichaud et al. | |
| 2014/0365215 A1* | 12/2014 | Kim | G10L 15/22 704/235 |
| 2015/0052231 A1* | 2/2015 | Sun | H04L 41/0803 709/223 |
| 2015/0142420 A1 | 5/2015 | Sarikaya et al. | |
| 2015/0154976 A1* | 6/2015 | Mutagi | H04L 12/281 704/275 |
| 2015/0286747 A1 | 10/2015 | Anastasakos et al. | |
| 2015/0317302 A1 | 11/2015 | Liu et al. | |
| 2016/0104480 A1* | 4/2016 | Sharifi | G10L 15/08 704/254 |

FOREIGN PATENT DOCUMENTS

| | | |
|---|---|---|
| WO | 2014/164484 A2 | 10/2014 |
| WO | 2015/030796 A1 | 3/2015 |

OTHER PUBLICATIONS

"Welcome to the Search Quality Rating Program," available at <<https://static.googleusercontent.com/media/www.google.com/en//insidesearch/howsearchworks/assets/searchqualityevaluatorguidelines.pdf>>, Google Inc., Mountain View, CA, Nov. 2015, 160 pages.
International Search Report and Written Opinion dated Jun. 9, 2017 from PCT Patent Application No. PCT/US2017/020552, 15 pages.

* cited by examiner

SCALABLE ENDPOINT-DEPENDENT NATURAL LANGUAGE UNDERSTANDING

BACKGROUND

In current practice, users frequently interact with computing devices and other equipment via language understanding (LU) systems. A typical LU system receives a spoken or typed linguistic item from the user in the course of the user's interaction with a particular application (or some other device functionality). As used herein, a "linguistic item" refers to any information expressed in a natural language, such as a query, command, etc. The LU system recognizes the words in the linguistic item and then interprets the meaning of the linguistic item as a whole, to provide interpretation results. The application then performs some action based on the interpretation results. For example, without limitation, based on a user's command or query, the application may perform: a search operation (e.g., to retrieve information from the Internet or other repository of information); a knowledge base lookup operation; a service access operation (e.g., to access a web service); a control operation to control some program functionality or equipment, etc.

Each developer typically generates an LU system that applies to a specific service point and application domain. For example, a developer may generate an LU system for specific use with a game console for the purpose of interpreting a user's game-playing commands. Another developer may generate an LU system for specific use with a smartphone for the purpose of providing navigational assistance to a user, and so on. The above-noted approach to developing LU systems, however, is labor-intensive, costly and prone to error.

SUMMARY

A computer-implemented technique is described herein for processing a linguistic item that is received from a particular endpoint mechanism. The particular endpoint mechanism corresponds to one of a set of possible endpoint mechanisms. In some cases, an endpoint mechanism corresponds to a particular user computing device through which a user enters a linguistic item; for example, a smartphone corresponds to one type of endpoint mechanism, while a game console corresponds to another endpoint mechanism. In other cases, an endpoint mechanism corresponds to a particular program component that runs on a user computing device, through which the user enters the linguistic item; for example, a browser program corresponds to one type of endpoint mechanism, while a message workflow program (e.g., a video conferencing component) corresponds to another endpoint mechanism. In either case, the endpoint-mechanism can be considered device-implemented because it runs on some computing device (or devices). The technique interprets the linguistic item using a language understanding (LU) system in a manner that takes into account the particular endpoint from which the linguistic item originated.

In one implementation, the LU system includes an interface component configured to receive a linguistic item from a particular endpoint mechanism. The LU system further includes an endpoint-independent subsystem, an endpoint-dependent subsystem, and a ranking component. The endpoint-independent subsystem interprets the linguistic item in a manner that is independent of the particular endpoint mechanism from which the linguistic item originated. The endpoint-dependent subsystem interprets the linguistic item in a manner that is dependent on the particular endpoint mechanism from which the linguistic item originated. The ranking component generates final interpretation results based on intermediate results generated by the endpoint-independent subsystem and the endpoint-dependent subsystem. The final interpretation results represent an interpretation of the meaning of the input linguistic item.

In one implementation, the endpoint-independent subsystem includes one or more endpoint-independent interpreter components, each of which operates in an endpoint-independent manner. The endpoint-dependent subsystem includes one or more endpoint-dependent interpreter components, each of which operates in an endpoint-dependent manner. Each interpreter component is configured to interpret linguistic items directed to a particular domain (e.g., a particular end user application scenario).

As a whole, the LU system is flexible and scalable in nature. Developers can add (and remove) new applications and accommodate the introduction of new endpoint mechanisms in a piecemeal manner without affecting all parts of the LU system. These characteristics, in turn, facilitate the development and maintenance of the LU system.

The LU system further provides accurate interpretations of linguistic items, e.g., by taking into account those cases in which the meaning of a linguistic item depends on the endpoint mechanism used to enter that linguistic item. Otherwise, the LU system provides a user experience that is generally consistent across different endpoint mechanisms.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
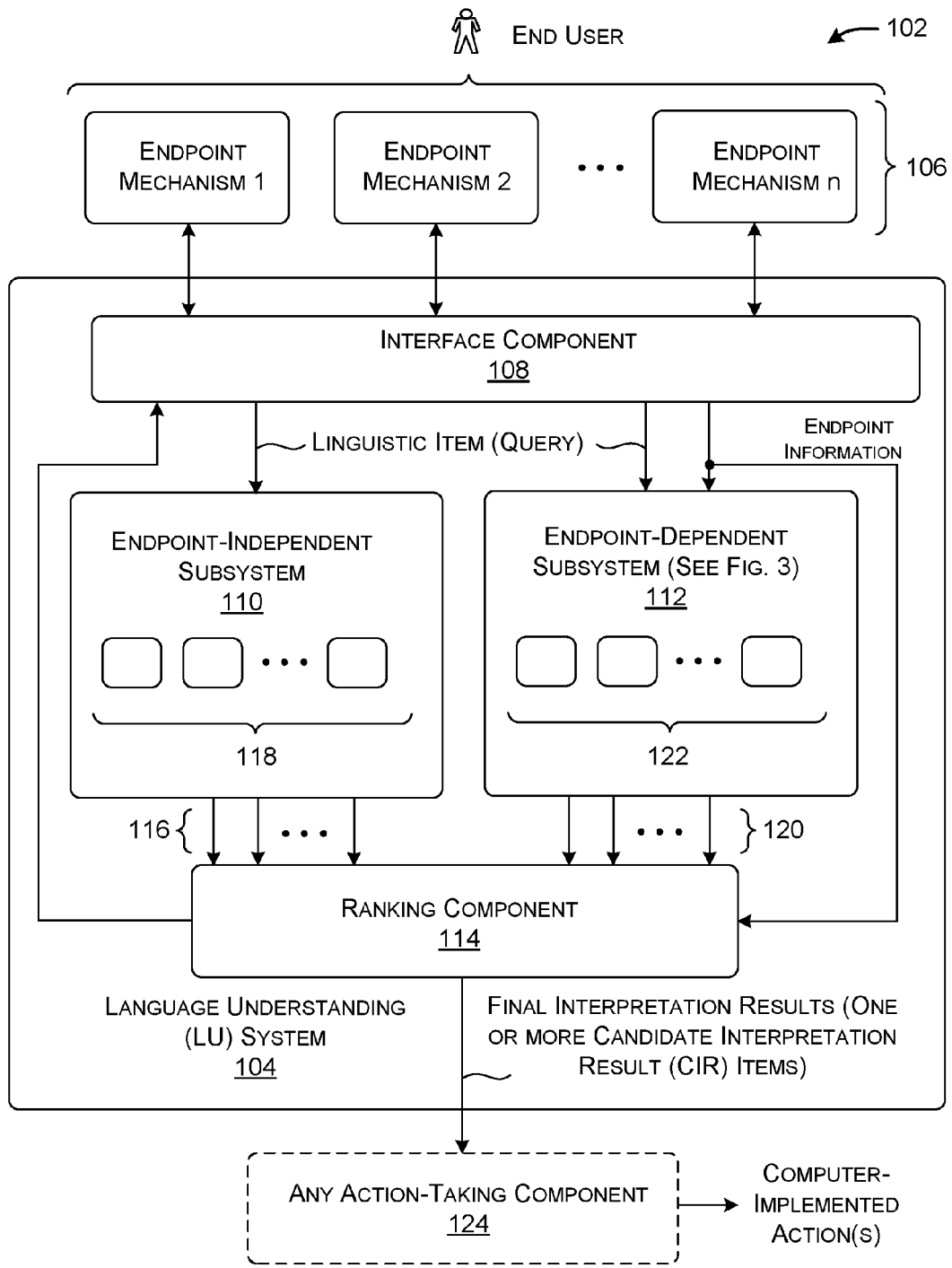
FIG. 1 shows an overview of one illustrative environment in which a language understanding (LU) system interprets linguistic items in a manner that depends on the endpoint mechanisms from which the linguistic items originated.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a language understanding (LU) system that interprets linguistic items in a manner that depends on the endpoint mechanisms from which the linguistic items originated. Section B sets forth illustrative methods which explain the operation of the LU system of Section A. And Section C describes illustrative computing functionality that can be used to implement any aspect of the features described in Sections A and B.

As a preliminary matter, some of the figures describe concepts in the context of one or more structural components, also referred to as functionality, modules, features, elements, etc. In one implementation, the various components shown in the figures can be implemented by software running on computer equipment, or hardware (e.g., chip-implemented logic functionality), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts can be implemented by software running on computer equipment, or hardware (e.g., chip-implemented logic functionality), etc., or any combination thereof.

As to terminology, the phrase "configured to" encompasses various physical and tangible mechanisms for performing an identified operation. The mechanisms can be configured to perform an operation using, for instance, software running on computer equipment, hardware (e.g., chip-implemented logic functionality), etc., or any combination thereof.

The term "logic" encompasses various physical and tangible mechanisms for performing a task. For instance, each operation illustrated in the flowcharts corresponds to a logic component for performing that operation. An operation can be performed using, for instance, software running on computer equipment, hardware (e.g., chip-implemented logic functionality), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

FIG. 1 shows an overview of one illustrative environment 102 in which a language understanding (LU) system 104 interprets linguistic items received from endpoint mechanisms 106. Generally, a linguistic item corresponds to any information expressed by a user in a natural language that is composed of one or more words and/or other meaning-bearing symbols. In some cases, for instance, a linguistic item may correspond to a query. A user may submit the query with the intent of retrieving information, such as when the user submits the query, "Show me movies by Tom Cruise." In other cases, a linguistic item may correspond to a command. A user may submit the command with the intent of controlling a piece of equipment, such as when the user says, "Play the movie Mission Impossible." In other cases, a linguistic item may correspond to any other expression that embodies any other respective user intent(s).

An endpoint mechanism, as the term is used herein, corresponds to any data processing equipment through which the user provides a linguistic item. In some cases, the endpoint mechanism corresponds to a particular user computing device, such as, but not limited to: a desktop personal computing device, a laptop computing device, a game console, a set-top box device, a tablet-type computing device, a media consumption device (such as an electronic book reader device), a smartphone, a wearable computing device, an intelligent appliance, and so on. In other cases, the endpoint mechanism corresponds to a program component, such as, but not limited to: a browser component, a messaging workflow component (such as a video conferencing component), and so on. In yet other cases, the endpoint mechanism corresponds to a combination of a particular program component which runs on a specific user computing device, such as a browser program which runs on a game console, etc. In any case, the endpoint mechanism can be said to be physical or device-implemented because it is implemented by one or more computing devices or other processing equipment.

A user may enter a linguistic item in any form. For example, a user may provide a linguistic item in spoken form, handwritten text form, typed text form, etc. An endpoint mechanism includes (or is otherwise associated with) an input device which receives the linguistic item. For example, a smartphone endpoint mechanism includes one or more microphones for receiving a user's spoken query or command.

Different endpoint mechanisms generally have different hardware features and/or software features. For example, a smartphone endpoint mechanism may include a light mechanism and a camera device, while a game console endpoint mechanism typically lacks these devices. In contrast, the game console endpoint mechanism may include one or more graphical processing units (GPUs), whereas the smartphone endpoint mechanism typically lacks this equipment. Further, different endpoint mechanisms will generally have access to different respective collections of applications.

Moreover, a user interacts with different endpoint mechanisms in different contexts. For example, the user may interact with the smartphone endpoint mechanism in mobile contexts, e.g., while walking, riding in a vehicle, etc. In contrast, the user typically interacts with the game console mechanism in fixed settings, such as a fixed home environment.

By virtue of the above differences, the user may, in certain situations, enter different linguistic items via different endpoint mechanisms. For example, the user may be more apt to issue a command to find a particular establishment (e.g., a restaurant, store, etc.) using the smartphone endpoint mechanism, compared to the game console endpoint mechanism. In contrast, the user may be more apt to issue a media control command via a home entertainment endpoint mechanism, compared to the smartphone endpoint mechanism.

The user's command or query may have the same lexical form, yet can express different intents in different respective contexts. For example, the user may issue the command, "find Hotel California" using a smartphone endpoint mechanism while moving through a particular city, with the aim of finding a hotel. The user may issue the same command using a home entertainment endpoint mechanism to find a particular song named "Hotel California." In another case, the user may issue the command "go home" using a smartphone endpoint mechanism with the intent of obtaining directions to the user's physical home. The user may issue the same command using a game console endpoint mechanism to access a homepage of a particular application.

In the above examples, the user's command or query targets different application domains, depending on the underlying intent of the user. For example, a user who issues the command "go home" using the smartphone endpoint mechanism is targeting a navigation application, while the user who issues the command "go home" using the game console endpoint mechanism may be targeting a media control application. In other cases, the user's input linguistic item may have different meanings in different contexts, but those separate meanings may all target the same application domain.

In yet other situations, the user's interaction with some applications is largely invariant to the endpoint mechanism through which the user accesses the applications. For example, consider a weather application that provides weather-related information. The user's query, "What is the current temperature in Seattle?" likely has the same meaning regardless of whether the user issues that query on his or her smartphone endpoint mechanism or the user's game console endpoint mechanism.

In summary, there may be ambiguity in the linguistic items entered by a user in different situations. To address this problem, the LU system 104 provides a single infrastructure for interpreting the user's input linguistic items in a manner that depends on the endpoint mechanisms through which the linguistic items have been entered. By virtue of this feature, the LU system 104 provides a way to accurately interpret the respective meanings of the linguistic items. Other benefits of the LU system 104 are set forth below.

In one implementation, the LU system 104 includes the main features of: an interface component 108, an endpoint-independent subsystem 110, an endpoint-dependent subsystem 112, and a ranking component 114. The main features of the LU system 104 will generally be described in top-to-bottom manner below. Later figures and accompanying explanation provide additional details regarding the above-noted features of the LU system 104, and the associated benefits thereof.

The interface component 108 provides any mechanism by which the LU system 104 receives linguistic items from the endpoint mechanisms 106. The interface component 108 also provides output results to the endpoint mechanisms and/or other entity(ies). For example, the interface component 108 can provide one or more user interface presentations through which the user can enter a linguistic item, e.g., in text-based form or some other form. In addition, the interface component 108 may provide functionality for processing the linguistic item, such as any of: routing equipment, load-balancing equipment, user authentication functionality, security functionality, and so on. The routing equipment routes an input linguistic item to both the endpoint-independent subsystem 110 and the endpoint-dependent subsystem 112.

In addition, the interface component 108 can include recognition functionality for converting input signals (that represent an input linguistic item) to recognized information for processing by the endpoint-independent subsystem 110 and the endpoint-dependent subsystem 112. For example, the interface component 108 can include a voice recognition component for converting audio signals that represent a spoken linguistic item to words associated with the linguistic item. The voice recognition component can use any known technology to perform this task, such as a machine-learned neural network. In addition, or alternatively, the interface component 108 can include a handwriting recognition component, etc. In other situations, the interface component 108 does not need to perform conversion, as when the user enters the linguistic item as free-form text using a keyboard input device.

The endpoint-independent subsystem 110 interprets the input linguistic item in a manner that is independent of the endpoint mechanism from which it originated, to generate first intermediate results 116. It does so using one or more endpoint-independent interpreter components 118. Each endpoint-independent interpreter component processes linguistic items that pertain to a particular domain, to generate interpreter results. A domain, in turn, refers to a scope of tasks that an interpreter component is designed to handle. For example, one kind of endpoint-independent interpreter component corresponds to weather-related domain. That endpoint-independent interpreter processes queries that pertain to the weather. The endpoint-independent interpreter component need not take account for the endpoint mechanism from which weather-related queries originate because this factor does not generally impact the meaning of the queries.

In some cases, an interpreter component may be designed to interact with a particular application. Here, the domain of the interpreter component is co-extensive with the scope of the tasks that the application is designed to handle. In other cases, an interpreter component may be designed to handle only a subset of tasks associated with a particular application or device function. In still other cases, an interpreter component may be designed to handle tasks that are associated with two or more applications or two or more device functions.

The endpoint-dependent subsystem 112 interprets the input linguistic item in a manner that is dependent on the endpoint mechanism from which it originated, to generate second intermediate results 120. It does so using one or more endpoint-dependent interpreter components 122. Each endpoint-dependent interpreter component processes linguistic items that pertain to a particular domain, to generate interpreter results. For example, one kind of endpoint-dependent interpreter component corresponds to a media search-related domain. That endpoint-dependent interpreter component processes queries that pertain to media items, such as song titles, movie titles, etc. That endpoint-dependent interpreter component takes account of the endpoint mechanism from which queries originate to help disambiguate certain queries, as when the user issues the above-noted query "find Hotel California" to determine whether the user wishes to find a song, as opposed to some other meaning.

The ranking component 114 receives the first intermediate results 116 from the endpoint-independent subsystem 110 and the second intermediate results 120 from the endpoint-dependent system 112. These intermediate results (116, 120) convey a plurality of possible candidate interpretation result (CIR) items. Each CIR item corresponds to a possible interpretation of the meaning of the input linguistic item. However, note that not every endpoint-independent interpreter component and every endpoint-dependent interpreter component needs to provide an interpretation. For example, a particular interpreter component may omit an interpretation when it determines that its domain has not been invoked and/or some other enabling condition has not been satisfied. In that case, the interpretation results for that interpreter component can provide an indication that no interpretation has been formed, e.g., by providing some null result information (either explicitly or implicitly). Hence, when this description says that the ranking component 114 receives both first intermediate results 116 and second intermediate results 120, that statement is to be liberally construed to encompass the case in which some of the results may convey null value information. Indeed, in some cases, only the endpoint-independent subsystem 110 or the endpoint-dependent subsystem 112 provides one or more non-null CIR items, but not both. In other situations, both subsystems (110, 112) contribute non-null CIR items.

Two or more CIR items may conflict, as when a first interpretation of the command "go home" reflects a request to navigate to the user's home, and a second interpretation of the command "go home" reflects a request to advance to a homepage. The ranking component 114 assigns a score value to each possible CIR item, corresponding to the likelihood that the CIR item reflects the true meaning of the linguistic item. The top-ranked CIR item corresponds to the most probable interpretation. Altogether, the ranking component 114 generates final interpretation results, which reflect all or some of the above-noted score values.

In other implementations, the LU system 104 omits the ranking component 114. In that case, the final interpretation results correspond to the intermediate interpretation results provided by the endpoint-independent subsystem 110 and the endpoint-dependent subsystem 112.

An action-taking component 124 performs some action based on the final interpretation results. The action-taking component 124 may represent part of any application. For instance, the action-taking component 124 may represent application functionality that is provided by the LU system 104 and/or some other system. Alternatively, or in addition, the action-taking component 124 may represent application functionality that is provided by the particular endpoint mechanism from which the linguistic item originated. Although not shown, the ranking component 114 can send the final interpretation results to the action-taking component 124 via the interface component 108 (in those implementations in which the action-taking component 124 is not part of the LU system 104 itself).

To name just a few examples, one type of action-taking component can perform a search or knowledge base lookup operation based on an interpreted user query. Another type of action-taking component can generate a navigation route in response to an interpreted user command. Another type of action-taking component can send a message in response to a user command. Another type of action-taking component can control the playback of a media item in response to a user command, or control some other piece of equipment or application, and so on.

Alternatively, or in addition, the action-taking component 124 can perform a system function. For example, assume that the LU system 104 concludes that the most likely interpretation of the user's linguistic item indicates that the user wishes to perform some task that cannot immediately be performed using the endpoint mechanism with which the user is currently interacting. For instance, the user may issue a command to "turn on flashlight," but the endpoint mechanism that the user is currently using lacks a light mechanism. Or the user may issue a command to "send the report to Jim," but the endpoint mechanism that the user is currently using has no message-sending capability. The action-taking component 124 can address this situation in different ways, such as by: presenting an error message to the user; providing instructions to the user regarding how to perform the desired task; performing a search based on the user's linguistic, item (e.g., to provide information regarding a topic of the user's query or command); instructing another endpoint mechanism to perform the desired task; saving information regarding the desired task in a remote central store (not shown) that enables the information to later be retrieved by an endpoint mechanism that can perform the task, and so on.

Overall, the LU system 104 provides various benefits. First, in certain cases, the LU system 104 modifies its interpretation of linguistic items based on the endpoint mechanisms used to provide those items. This feature improves the overall accuracy of the LU system's interpretations. For example, the LU system 104 can correctly interpret the command "go home" based on knowledge of the endpoint mechanism used to enter that command. The improved accuracy enhances the user experience.

Second, the LU system 104 provides a single integrated framework for processing linguistic items submitted by users. That single framework helps provide a consistent user experience across different endpoint mechanisms, when interacting with each particular domain of analysis. For instance, consider an application that performs a media search function. A user will perceive the application as behaving in the same basic manner regardless of what endpoint mechanism that the user uses to interact with the application, except, as noted above, with respect to those particular situations when the endpoint information does impact the interpretation of linguistic items.

Third, the LU system 104 handles changes to the environment 102 in a scalable and efficient manner. For instance, as will be described more fully in Section B, a developer can add a new interpreter component and/or accommodate a new endpoint mechanism without redesigning the LU system 104 as a whole.

Figure 2:
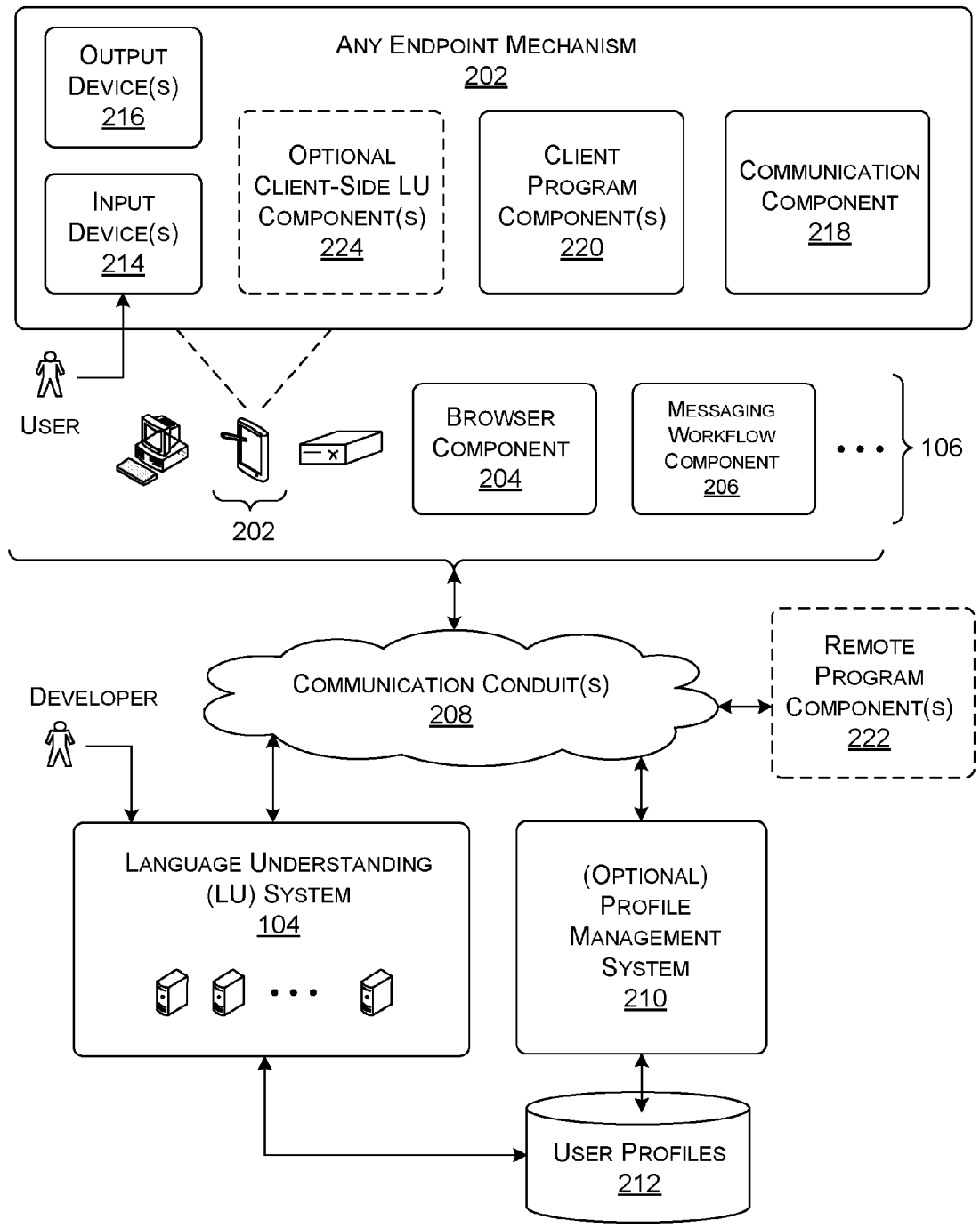
FIG. 2 shows one particular implementation of the environment of FIG. 1.

FIG. 2 shows one particular implementation of the environment 102 of FIG. 1. Here, the set of endpoint mechanisms 106 correspond to various user computing devices (e.g., a desktop personal computing device endpoint mechanism, a smartphone endpoint mechanism 202, a game console endpoint mechanism, etc.). The endpoint mechanisms 106 can also include one or more program components, such as a browser component 204, a messaging workflow component 206 (e.g., a video conferencing component), etc.

The LU system 104 may correspond to computing functionality that is remote with respect to the endpoint mechanisms 106, e.g., corresponding to a cloud computing environment that includes one or more server computing devices. The server computing devices can be provided at a single site or may be distributed over plural sites. Each endpoint mechanism can interact with the LU system 104 via one or more communication conduits 208. The communication conduit(s) 208 may correspond to a local area network, a wide area network (e.g., the Internet), one or more point-to-point links, etc., or any combination thereof.

The LU system 104 can detect an endpoint mechanism that the user is using in different ways. In one approach, the endpoint mechanism sends the linguistic item together with a field value that identifies the type of endpoint mechanism that is being used. The endpoint mechanism can send one or more other field values that identify other capabilities of the endpoint mechanism that is being used (such as the hardware capabilities of the endpoint mechanism, etc.). The LU system 104 can read those field value(s) to determine the nature of the endpoint mechanism that is being used. The LU system 104 can also optionally determine the identity of the user in different ways, e.g., based on an authenticated user session that the interface component 108 has set up with the endpoint mechanism, and/or based on user-identifying information that is submitted by the endpoint mechanism along with the linguistic item.

An optional profile management system 210 may maintain user profiles that are associated with different respective users. A data store 212 stores the user profiles. Each user profile provides information regarding a particular user, such as user preferences, user demographic information, user history information, etc. Each user profile can also include customized language understanding information pertaining to the user, such as one or more user-specific language understanding models, preference values, rules, prior linguistic items (submitted by the user), etc. The LU system 104 can interpret a user's linguistic items in a customized manner based on the user's profile provided in the data store 212. In other cases, the LU system 104 interprets the user's linguistic items in a user-agnostic manner, that is, without reference to any user-specific information.

FIG. 2 also depicts components of one illustrative endpoint mechanism 202, e.g., which may correspond to a smartphone endpoint mechanism. The endpoint mechanism 202 includes one or more input devices 214 for receiving a linguistic item from a user (e.g., a key input mechanism, a microphone, a touchscreen interface mechanism, etc.). The endpoint mechanism 202 also includes one or more output devices 216 for displaying output results, including a display screen, a speaker, a printer, etc. The endpoint mechanism 202 also includes a communication component 218 for interacting with the LU system 104, e.g., corresponding to a network card or the like.

The endpoint mechanism 202 also includes one or more client-side program components 220 for performing various tasks. For example, without limitation, the client-side program components 220 can include a navigation program component for performing a navigation function, a media access program component for controlling the presentation of media items, a search program component for performing a search function, and so on. Alternatively, the endpoint mechanism 202 can interact with one or more remotely-implemented program components 222. The remotely-implemented program components 222 may correspond to application functionality provided by one or more remote server computing devices. Alternatively, any program component to which the endpoint mechanism 202 has access can be implemented in distributed fashion by some application functionality provided by the (local) endpoint mechanism 202 and some application functionality provided by a remote server computing device (or devices).

In yet other cases, an endpoint mechanism corresponds to a program component that runs on a user computing device. Such an endpoint mechanism, for instance, may correspond to the browser component 204 or the messaging workflow component 206, etc. Alternatively, an endpoint mechanism corresponds to a program component that runs on one or more server computing devices and/or on some other computing platform. Alternatively, an endpoint mechanism may correspond to a program component that is implemented in a distributed fashion by a user computing device (corresponding to local functionality) and one or more server computing devices (corresponding to remote functionality).

Finally, FIG. 2 indicates that the endpoint mechanism 202 can optionally include any client-side language understanding (LU) component(s) 224. In one case, the client-side LU component(s) 224 locally perform one or more tasks that were described above as being performed by the remote LU system 104. In another case, the client-side LU component(s) 224 perform all of the tasks of the LU system 104, thereby entirely eliminating the use of the (remote) LU system 104. For instance, a smartphone endpoint mechanism can locally interpret an input linguistic item using its own resources without interacting with the LU system 104. In other words, in this implementation, each user computing device can implement its own instantiation of the LU system 104.

Figure 3:
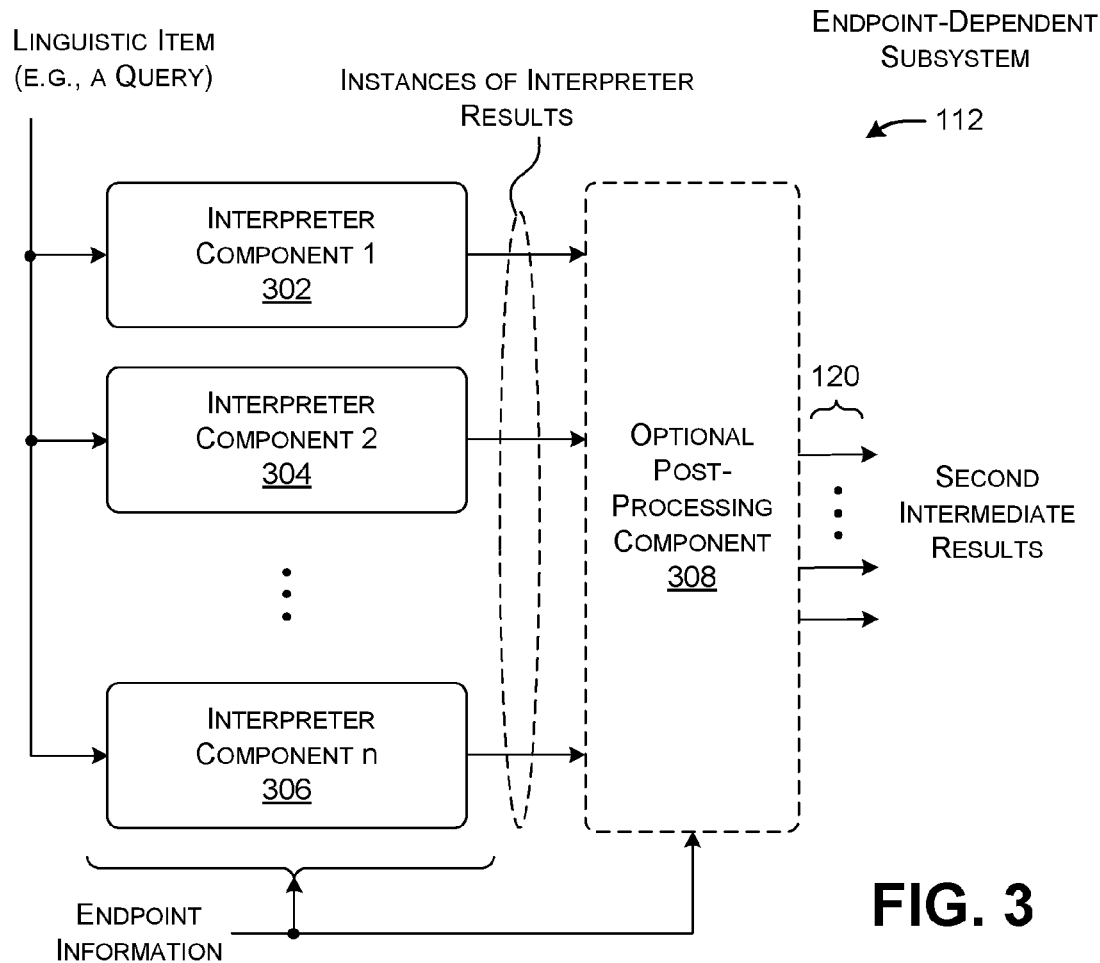
FIG. 3 shows an endpoint-dependent subsystem for use in the environment of FIG. 1 that includes one or more interpreter components.
Figure 4:
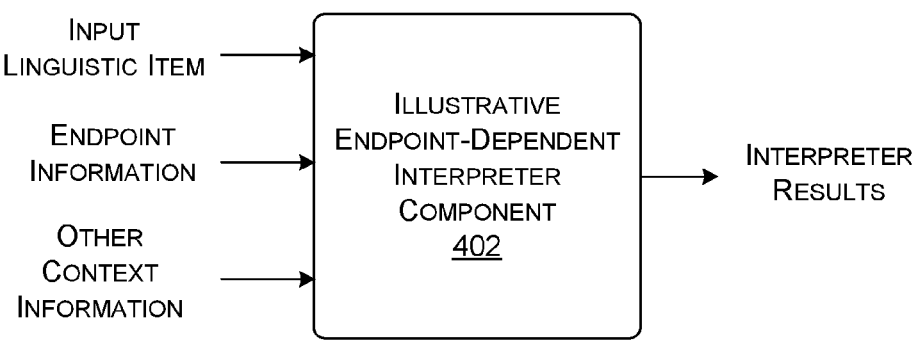
FIG. 4 shows a high-level representation of an illustrative endpoint-dependent interpreter component for use in the subsystem of FIG. 3.

FIG. 3 shows a more detailed illustration of one implementation of the endpoint-dependent subsystem 112 of FIG. 1. The endpoint-dependent subsystem 112 includes one or more endpoint-dependent interpreter components (302, 304, 306). FIG. 4 shows one such illustrative endpoint-dependent interpreter component 402. The endpoint-dependent interpreter component 402 receives the input linguistic item, endpoint information, and/or other context information. The endpoint information describes the type of endpoint mechanism that has provided the linguistic item. The other context information can describe other aspects of the context in which the linguistic item has been provided, such as the location of the endpoint mechanism, the time of day, the state of motion of the endpoint mechanism, and so on. The endpoint-dependent interpreter component 402 generates interpreter results, which express an interpretation of the linguistic item.

The endpoint-independent subsystem 112 optionally also includes a post-processing component 308. The post-processing component 308 generates the second intermediate results 120 (whereas the endpoint-independent system 110 generates the first intermediate results 116). Alternatively, if the post-processing component 308 is omitted, the various instances of the interpreter results (provided by the endpoint-dependent interpreter components (302, 304, 306)) correspond to the second intermediate results 120.

When used, the post-processing component 308 can perform various post-processing tasks. For example, the post-processing component 308 can filter out one or more instances of interpreter results that are not viable, in view of the endpoint information. For example, assume that the user issues the command, "turn on flashlight" while using a game console endpoint mechanism. Further assume that one of the endpoint-dependent interpreter components interprets the linguistic item as a request to turn on a light mechanism associated with the endpoint mechanism. The post-processing component 308 can disable this interpretation (and its associated interpreter results) because the game console endpoint mechanism does not include a light mechanism. The post-processing component 308 would not disable this interpretation, however, if the user had provided the same command via a smartphone endpoint mechanism; this is because a smartphone endpoint mechanism typically includes a light mechanism. In another implementation, the post-processing component 308 can assign a probability weight to the above-described interpretation, instead of outright eliminating it. In yet another implementation, the interpreter component which interprets the command "turn on flashlight" can incorporate the above-described function of the post-processing component 308, e.g., by suppressing an unlikely interpretation or assigning a low score to an unlikely interpretation. This implementation would eliminate the use of the post-processing component 308 with respect to this particular function.

Note that an individual endpoint-dependent interpreter component can have any scope, depending on how it is configured by a developer. For example, one kind of endpoint-dependent interpreter component can analyze linguistic items with respect to a single endpoint mechanism, and with respect to a particular domain. Another kind of endpoint-dependent interpreter component can analyze linguistic items with respect to two or more endpoint mechanisms, with respect to a particular domain.

Although not shown, the endpoint-independent system 110 of FIG. 1 can have the same architecture and behavior as the above-described endpoint-dependent subsystem 112, with the exception that the endpoint-independent system 110 does not take into consideration the endpoint information. Further, the endpoint-independent subsystem 110 can (optionally) omit the post-processing component 308.

Generally note that FIG. 1 indicates that different components in the LU system 104 can take account of the endpoint information (which indicates what endpoint mechanism has been used to provide the linguistic item), including any endpoint-dependent interpreter component (e.g., interpreter components 302, 304, 306), the post-processing component 308 (if used), and the ranking component 114. For example, an endpoint-dependent interpreter component can make a first-level interpretation of an input query based, in part, on the endpoint information. The ranking component 114 can make a second-level decision to process the results provided by individual interpreter components. In doing so, the ranking component 114 can determine whether the best interpretation of the input query is given by an endpoint-independent interpreter component or an endpoint-dependent interpreter component. Or the ranking component 114 can generate final interpretation results based on some combination of results provided by two or more interpreter components.

Figure 5:
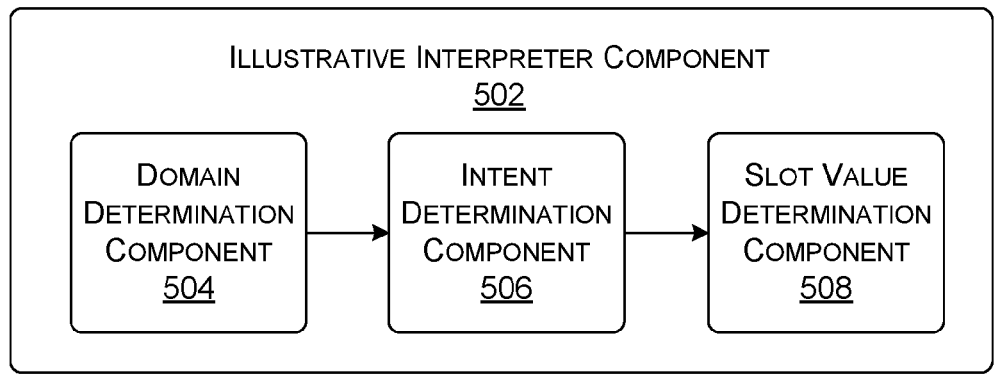
FIGS. 5-7 show three respective implementations of an interpreter component.

FIG. 5 shows a first implementation of any interpreter component 502, e.g., corresponding to either an endpoint-independent interpreter component or an endpoint-dependent interpreter component. The interpreter component 502 includes a domain determination component 504, an intent determination component 506, and a slot value determination component 508.

The domain determination component 504 determines the most probable domain associated with the input linguistic item. As noted above, a domain pertains to the general theme to which the linguistic item belongs, which may correspond to a set of tasks handled by a particular application, or a subset of those tasks. For example, the domain determination component 504 may determine that the command "find Mission Impossible" pertains to a media search domain.

The intent determination component 506 determines an intent associated with the input linguistic item. An intent corresponds to an objective that a user likely wishes to accomplish by submitting the linguistic item. For example, a user who submits the command "find Mission Impossible" intends to find a particular movie having the name of "Mission Impossible." A user who submits the command "buy Mission Impossible" intends to purchase the movie "Mission Impossible," and so on. In the situation in which the domain includes only a single intent, the interpreter component 502 can omit the domain determination component 504. The intent determination component 506 can also base its analysis on the classification result provided by the domain determination component 504.

The slot value determination component 508 determines slot values in the linguistic item. The slot values correspond to information items that an application needs to perform a requested task, upon interpretation of the linguistic item. For example, the command, "find Jack Nicolson movies in the comedy genre" includes a slot value "Jack Nicolson," that identifies an actor having the name of "Jack Nicolson," and a slot value "comedy," corresponding to a requested genre of movies. The slot value determination component 508 can also base its analysis on the classification results provided by the domain determination component 504 and/or the intent determination component 506.

Any of the domain determination component 504, intent determination component 506, and slot value determination component 508 can use any technology to perform their respective functions. For example, any of these components (504, 506, 508) can use one or more machine-learned (statistical) models. Such a model maps a collection of input feature values to a model output value, using a set of machine-learned weight values. A training system (not shown) derives the weight values based on a training set of labeled linguistic items. Some feature values describe characteristics of the linguistic item. Other features values describe contextual factors pertaining to the linguistic item, e.g., which describe the circumstance in which the linguistic item has been submitted. In the particular case of an endpoint-dependent interpreter component, one or more context-related feature values may describe the type of endpoint mechanism that has been used to provide the linguistic item. In addition, one or more other context-related feature values can describe the hardware and/or software capabilities of the endpoint mechanism. For example, one context-related feature value may indicate whether the endpoint mechanism has a light mechanism, etc.

To cite merely one illustrative and non-limiting case, the domain determination component 504 may correspond to a machine-learned classification model, such as a linear model, deep-structured neural network model, a cluster model, a decision tree model, a support vector machine model, and so on. The intent determination component 506 can likewise correspond to any of these models.

For example, one linear model can generate a classification score value y given by the formula $y=w_1*f_1+w_2*f_2+\ldots w_n*f_n$, where $w_i$ corresponds to a machine-learned weight value, and $f_i$ correspond to a feature value. The score value y maps to a particular classification outcome. One neural network model can include N layers of neurons that map an input vector $z_1$ into an output vector y. The input vector $z_1$ describes the input linguistic item. The values in any layer j may be given by the formula, $z_j=f(W_j z_{j-1}+b_j)$, for $j=2,\ldots N$. The symbol $W_j$ denotes the j-th weight matrix produced by a training system (not shown), and the symbol $b_j$ refers to an optional j-th bias vector, also produced by the training system. The function $f(x)$, referred to as the activation function, can be formulated in different ways, such as the tan h function. The score vector y maps to a particular classification outcome.

The slot value determination component 508 may correspond to a machine-learned Conditional Random Field (CRF) model. In this approach, a CRF model provides the most probable slot sequence defined by:

$$\hat{Y} = \underset{Y}{\operatorname{argmax}}\, p(Y|X).$$

In this equation, the term X refers to a sequence of tokens in a detected linguistic item $(x_1, x_2, \ldots, x_T)$ and Y refers to a sequence of tags $(y_1, y_2, \ldots, y_T)$ assigned to the tokens, where the tags are selected from a set C of possible tags. The tags correspond to slot variables, such as, in the media search domain, the tags, "actor name," "release date," "genre," etc. In the above example, the CRF model would determine that the term "Jack Nicolson" corresponds to an actor name, having the particular value "Jack Nicolson."

Alternatively, or in addition, any of the domain determination component 504, intent determination component 506, and slot value determination component 508 can use a rule-application engine to perform its respective analysis. For example, any of these components (504, 506, 508) can apply rules which maps certain keywords in an input linguistic item to appropriate classification results. For instance, the intent determination component 506 can apply a rule that indicates that any linguistic item that matches the template "buy <x>" refers to an intent to buy a particular product, where that product is identified by the value of variable x.

Other rules can take the endpoint information into account. For example, one rule can indicate that a linguistic item that reads "go home" indicates that the user wishes to find directions to his (physical) home, but only when the user issues this command via his or her smartphone endpoint mechanism or car navigation endpoint mechanism. Otherwise, the rule can indicate that the linguistic item "go home" indicates that that the user wishes to return to a homepage of some application. Any rule can be expressed in any manner, such as by an IF-THEN expression, a REGEX expression, a lookup table or function, etc.

The above-described technology is cited by way of illustration, not limitation; the interpreter component 502 can use yet other strategies to interpret a linguistic item, such as a language parser that uses a parse tree to analyze the linguistic item and label its parts with descriptive tags.

Figure 6:
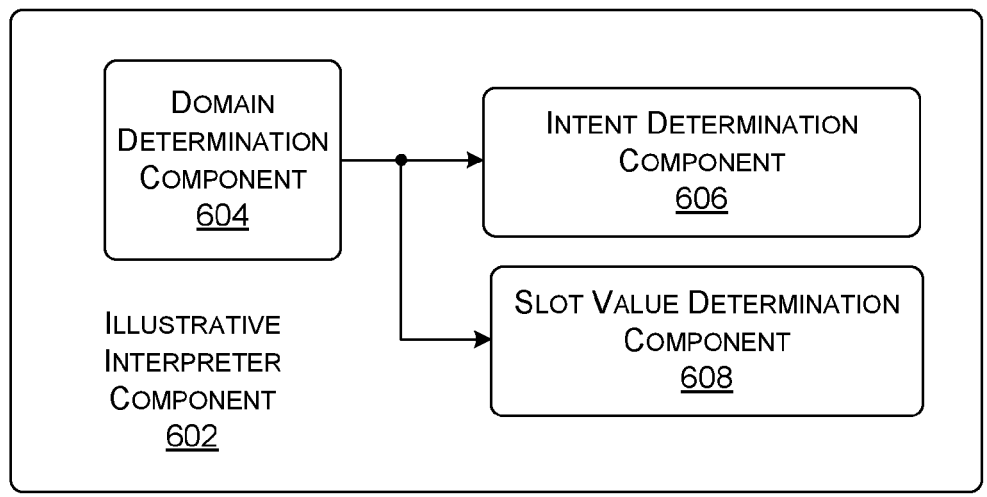

FIG. 6 shows another interpreter component 602 that includes a domain determination component 604, an intent determination component 606, and a slot value determination component 608. The interpreter component 602 has the same construction and operation as the interpreter component 502 of FIG. 5, except that, in FIG. 6, the intent determination component 606 performs its operation in parallel with the slot value determination component 608, instead of in series.

Figure 7:
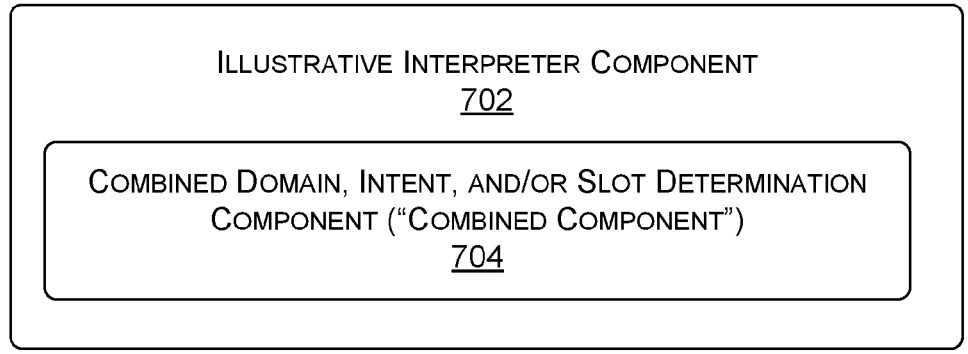

FIG. 7 shows another interpreter component 702 that includes a combined component 704 that combines the functions of the above-described domain determination component, intent determination component, and slot value determination component (or some subset thereof). The combined component 704 can use any of the above-described technology to perform its task, such as a machine-learned model, a rule-application engine, a language parser, etc.

The ranking component 114 (of FIG. 1) can likewise use any of the above-described technology to rank candidate interpretation result (CIR) items. For example, the ranking component 114 can use a machine-learned model. For instance, the ranking component 114 can be implemented using a linear model, a decision-tree model (or a boosted decision tree model), a support vector machine model, a probabilistic relevance model, etc., or any combination thereof.

In operation, a machine-learned ranking component 114 receives, as input, one more feature values that describe a CIR item to be ranked. For instance, the CIR item may correspond to interpreter results provided by a particular interpreter component; in that case, the machine-learned model can receive one or more feature values which describe those interpreter results. The machine-learned model can also receive one or more other feature values that describe the endpoint information and/or other context information. As noted above, the endpoint information describes the type of endpoint mechanism that has provided the linguistic item. The other context information can describe other aspects of the context in which the linguistic item has been provided, such as, but not limited to: the user's current location; the current time of day; the user's state of motion; the user's current user session (e.g., describing other queries and actions performed by the user in the current user session), etc. The LU system 104 can also retrieve context information from one or more external sources, such as knowledge bases, etc. The ranking component 114 uses its model(s) to map all of the input feature values into a probability value associated with the CIR under consideration. After generating a probability value for each interpreter component (and corresponding CIR item), the ranking component 114 can identify the CIR item having the highest likelihood, which corresponds to the most likely meaning of the linguistic item.

Figure 8:
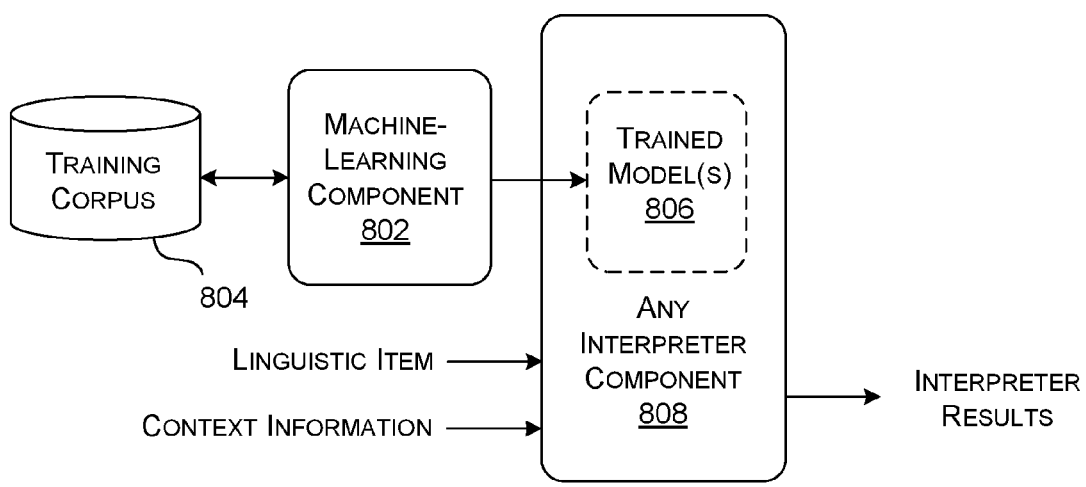
FIG. 8 illustrates an interpreter component that uses a machine-learned model.

Advancing to FIG. 8, this figure generally shows a machine-learning component 802 that operates on a corpus of training examples (in a data store 804) to produce a trained model 806. An interpreter component 808 corresponds to any interpreter component of the LU system 104 or part thereof. The interpreter component 808 uses the trained model 806 to analyze an input linguistic item (together with context information, such as endpoint information), to provide interpreter results. The machine-learning component 802 can use any machine-learning technique to produce any corresponding machined-learned model, non-limiting examples of which were described above.

The training examples in the data store 804 correspond to labeled linguistic items. For example, consider a collection of linguistic items that is used to generate an intent model. Each such training example can include a linguistic item (e.g., a query, command, etc.), an interpretation of that linguistic item (specifying a particular intent), and an indication of whether that interpretation is correct or incorrect. The interpretation and its evaluation (as being correct or incorrect) constitute a label for the linguistic item. A training example that is designated as being correct constitutes a positive training example, while a training example that is designated as being incorrect constitutes a negative training example. An expert may provide the intent labels. Alternatively, or in addition, feedback information provided by end users may constitute the intent labels. Alternatively, or in addition, some automated mechanism can be used to generate inferred intent labels.

Figure 9:
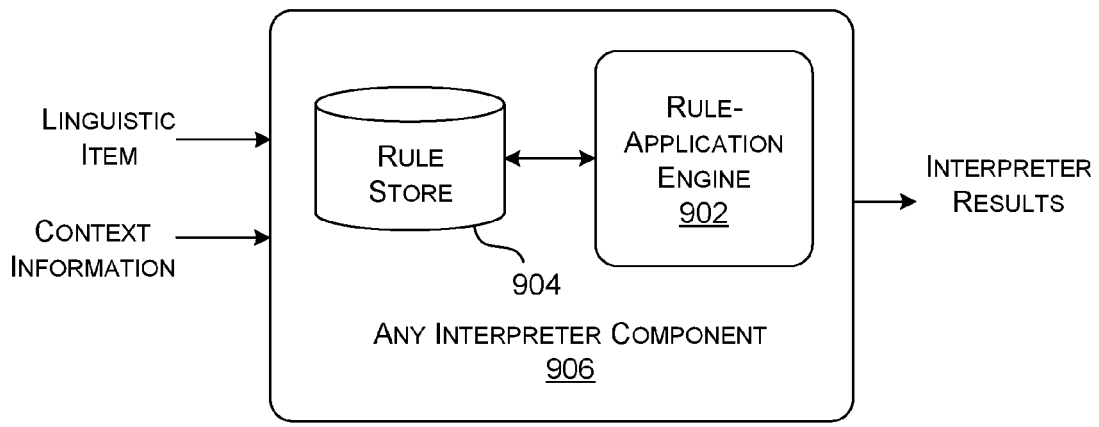
FIG. 9 shows an interpreter component that uses a rule-application engine.

FIG. 9 shows a rule-application engine 902 and an associated collection of rules (in a data store 904) for implementing the logic associated with an interpreter component 906. The interpreter component 906 again corresponds to any interpreter component of the LU system 104 or part thereof. The rule-application engine 902 can be implemented using any rule-based technology, such as an engine that applies a collection of IF-THEN rules, an artificial intelligence engine, an expert system, etc. An IF-THEN rule maps a particular linguistic item (and context information associated therewith) to interpreter results. For example, one IF-THEN rule can indicate that IF the user's input command contains the phrase "go home," and IF the user is currently interacting with a game console endpoint mechanism, THEN the correct interpretation should reflect that the user intends to advance to a home page presentation.

In other cases, any interpreter component can incorporate both the type of machine-learning technology shown in FIG. 8 and the rule-based technology shown in FIG. 9. For example, an interpreter component can use a machine-learned module to generate first interpreter results. The same interpreter component can use a rule-based module to generate second interpreter results, e.g., in parallel with the operation of the machine-learned module. The interpreter component can then use a combiner module to generate final interpreter results based on the first interpreter results and the second interpreter results. For example, the combiner component can concatenate (combine) the first interpreter results and the second interpreter results, or it can choose between the first interpreter results and the second interpreter results, or it can generate third interpreter results based on the evidence provided by the first interpreter results and the second interpreter results, and so on. The combiner component can itself use machine-learned and/or rule-based technology to perform its tasks. In another implementation, any interpreter component can apply a machine-learned module in series with a rule-based module, e.g., wherein the rule-based module receives interpreter results from the machine-learned module or vice versa.

The ranking component 114 can use either the technology of FIG. 8 or FIG. 9, or a combination thereof. With respect to machine-learning technology, the training examples in the data store 804 can include labels that reflect feedback information from end users. For example, upon receiving final interpretation results, an end user can explicitly or implicitly indicate whether the answer (conveyed by those results) is correct or incorrect. As a result, a machine-learned ranking component 114 implicitly takes into account the historical popularity of different interpretation results, with respect to the use of different endpoint mechanisms. This further means that, when confronted with an ambiguous situation, a machine-learned ranking component 114 will generally rank a historically popular interpretation over a less popular interpretation. With respect to rule-based technology, the ranking component 114 can apply one or more rules that empirically reflect endpoint-specific popularity information.

Finally, note that any machine-learned model or rule-application engine can correspond to user-specific functionality or user-agnostic functionality. In the former case, a model or engine provides results that are customized for an individual user. For example, a user-specific machine-learned model can be developed based on a corpus of training examples that corresponds to previous queries submitted by a particular user. In the latter (user-agnostic) case, a model or engine provides results that are independent of the particular user who interacts with the model or engine. In a third implementation, any model or engine can correspond to hybrid functionality which includes a user-specific component and a user-agnostic component.

B. Illustrative Processes

Figure 10:
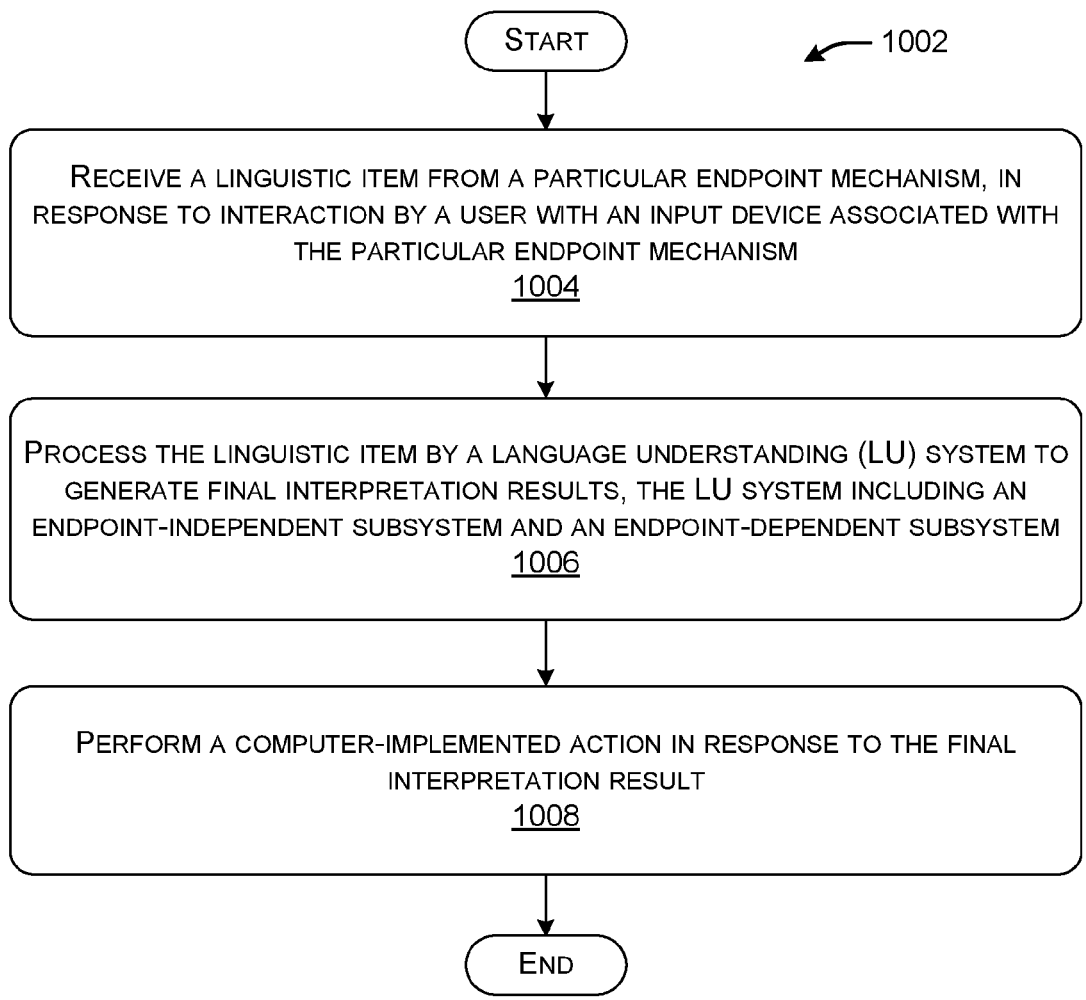
FIG. 10 shows an illustrative process that describes one manner of operation of the LU system of FIG. 1.
Figure 11:
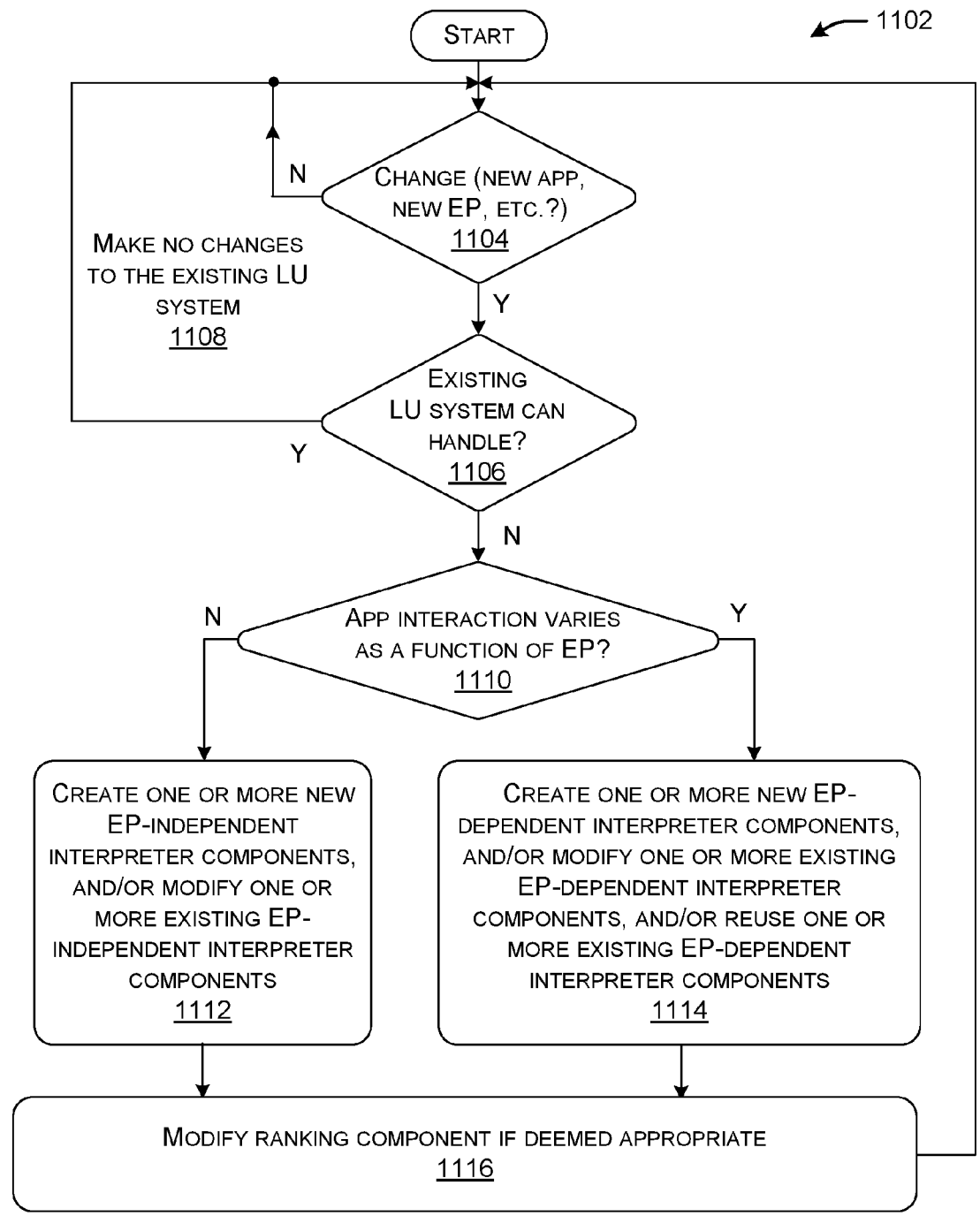
FIG. 11 shows an illustrative process by which a developer may address changes to the environment (of FIG. 1).

FIGS. 10 and 11 show illustrative processes (1002, 1102) that explain the operation of the language understanding (LU) system 104 of Section A in flowchart form. Since the principles underlying the operation of the LU system 104 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

In block 1004 of FIG. 10, the LU system 104 receives a linguistic item from a particular device-implemented endpoint mechanism, in response to interaction by a user with an input device associated with the particular endpoint mechanism. The particular endpoint mechanism corresponds to one of a set of different types of endpoint mechanisms 106. In block 1006, the LU system 104 processes the linguistic item to generate final interpretation results. The LU system 104 includes: an endpoint-independent subsystem 110 for interpreting the linguistic item in a manner that is independent of the particular endpoint mechanism from which the linguistic item originated, which yields first intermediate results; and an endpoint-dependent subsystem 112 for interpreting the linguistic item in a manner that is dependent on the particular endpoint mechanism, which yields second intermediate results. In block 1008, the action-taking component 124 performs a computer-implemented action in response to the final interpretation results.

FIG. 11 shows a process 1102 for addressing changes to the environment 102 (of FIG. 1). A developer performs this analysis with respect to an application under consideration (referred to for brevity below as "the application"). For instance, the application may correspond to a new or existing application provided by the developer. A developer may perform the process 1102 of FIG. 1 in a manual manner, with or without the assistance of statistical analysis tools (described below).

In block 1104, the developer determines whether a change has occurred to the environment 102 that may warrant changes to the LU system 104. For example, the developer may reach this conclusion when: a new application has been (or will be) introduced to the environment 102; or an existing application has been (or will be) removed from the environment 102; or a modified version of an existing application has been (or will be) introduced to the environment 102; or a new endpoint mechanism has been (or will be) introduced to the environment 102, with which an existing application interacts (or is anticipated to interact).

In block 1106, the developer determines whether the existing LU system 104 can handle the changes identified in block 1104. The developer can make this determination based on empirical information, e.g., by identifying whether the existing LU system 104 provides adequate service to the application. For example, the developer can make this determination based on explicit or implicit feedback from end users who interact with the application. Alternatively, or in addition, the developer can make the determination of block 1106 in a manual manner, e.g., by reasoning about the application vis-à-vis the current capabilities of the LU system 104. For example, the developer can conclude that the current LU system 104 does not handle the application because the application is new and pertains to a new domain, to which none of the existing interpreter components pertain.

In block 1108, if it is determined that the current LU system 104 can handle the application, then the developer will make no changes to the existing LU system 104. The processing flow then returns to block 1104. For instance, the developer may conclude that one or more existing endpoint-independent interpreter components adequately handle a new application or a new endpoint mechanism. The developer will then continue to rely on these existing endpoint-independent interpreter components to handle the current state of the environment 102.

Alternatively, assuming that a change is warranted to the LU system 104, in block 1110, the developer determines whether interaction with the application varies as a function of endpoint mechanisms that are used to enter linguistic items. For the case of a new or modified application, block 1110 entails determining whether it is empirically known (or it can be reasonably concluded) that the interpretation of the users' linguistic items vary (or will vary) based on the endpoint mechanisms used to enter the linguistic items. For the case of an existing application, block 1110 may entail determining whether it is empirically known (or it can be reasonably concluded) that the interpretation of the users' linguistic items vary (or will vary) based on the introduction of one or more new endpoint mechanisms, such as a new user computing device, a new browser component, a new messaging workflow component, etc.

The developer can make the decision of block 1110 by collecting groups of linguistic items pertaining to different endpoint mechanisms, and then manually (and/or automatically) tagging the linguistic items with their actual respective meanings. The developer can then perform statistical analysis to determine whether the meanings of the linguistic items vary as a function of endpoint information (that identifies the endpoint mechanism used to enter the linguistic items). For example, the developer can reach the above conclusion when he or she finds that the same linguistic items have different meanings when entered via different respective endpoint mechanisms.

First consider the case in which block 1110 is answered in the negative. Then, in block 1112, the developer creates one or more new endpoint-independent interpreter components to handle the users' interaction with the application. Alternatively, or in addition, the developer can modify one or more existing endpoint-independent interpreter components. A developer can make a change to an existing interpreter component in different ways, such as by retraining an existing machine-learned interpreter component based on an updated training set, modifying the set of rules used by a rule-application engine, and so on.

Assume next that block 1110 is answered in the positive. Then, in block 1114, the developer creates one or more endpoint-dependent interpreter components. Alternatively, or in addition, the developer can modify one or more existing endpoint-dependent interpreter components. Alternatively, or in addition, the developer can designate one or more existing endpoint-dependent interpreter components as suitable for handling a new endpoint mechanism. The last mentioned option may be appropriate for the case in which the developer concludes that an existing endpoint-dependent interpreter component can adequately handle a class of endpoint mechanisms, and that the new endpoint mechanism should be added to that class.

Finally, in block 1116, the developer can make one or more changes, if deemed appropriate, to the ranking component 114, e.g., to take account for the introduction (or removal) of a new or modified application, a new endpoint mechanism, etc. Again, such a modification can constitute retraining a machine-learned model, adjusting the rules used by a rule-application engine, etc.

Note that FIG. 11 correspond to a simplified case in which binary decisions are made regarding the application as a whole. In other cases, an application under consideration can be regarded as having different parts. In that case, a developer can apply the process 1102 of FIG. 11 for each such part, considering it as an application in its own right. In the context of block 1106, the developer may conclude that an existing endpoint-independent interpreter component can adequately handle a first part of an application, and therefore no changes to the LU system 104 are warranted for that first part. But the developer may conclude that changes to the LU system 104 are appropriate for a second part of the application.

One general conclusion that applies to the process 1102 as a whole may be stated as follows. The LU system 104 accommodates changes to the environment 102 in a scalable manner. This means that the developer can introduce a new application to the environment 102, or account for the introduction of a new endpoint mechanism that affects an existing application, in a piecemeal manner without (necessarily) changing the entire LU system 104.

C. Representative Computing Functionality

Figure 12:
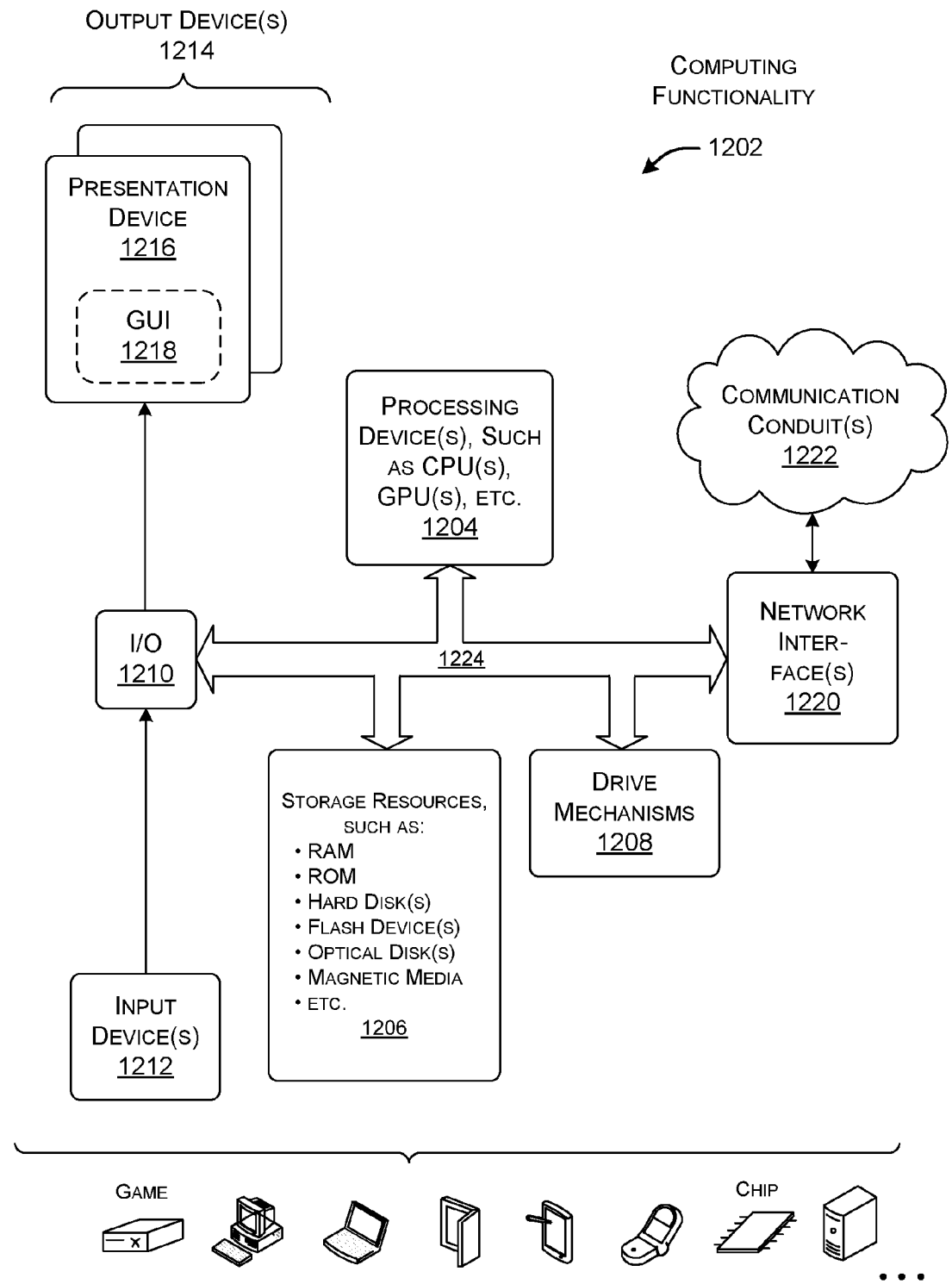
FIG. 12 shows illustrative computing functionality that can be used to implement any aspect of the features shown in the foregoing drawings.

FIG. 12 shows computing functionality 1202 that can be used to implement any aspect of the mechanisms set forth in the above-described figures. For instance, the type of computing functionality 1202 shown in FIG. 12 can be used to implement any aspect of the language understanding (LU) system 104. That is, for instance, the computing functionality 1202 may correspond to at least one server computing device. Or the type of computing functionality 1202 shown in FIG. 12 can be used to implement any aspect of an endpoint mechanism. That is, for instance, the computing functionality 1202 may alternatively correspond to a user computing device. In all cases, the computing functionality 1202 represents one or more physical and tangible processing mechanisms.

The computing functionality 1202 can include one or more hardware processor devices 1204, such as one or more central processing units (CPUs), and/or one or more graphical processing units (GPUs), and so on. The computing functionality 1202 can also include any storage resources (also referred to as computer-readable storage media or computer-readable storage medium devices) 1206 for storing any kind of information, such as machine-readable instructions, settings, data, etc. Without limitation, for instance, the storage resources 1206 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 1202. The computing functionality 1202 may perform any of the functions described above when the hardware processor device(s) 1204 carry out computer-readable instructions stored in any storage resource or combination of storage resources. The computing functionality 1202 also includes one or more drive mechanisms 1208 for interacting with any storage resource, such as a hard disk drive mechanism, an optical disk drive mechanism, and so on.

The computing functionality 1202 also includes an input/output component 1210 for receiving various inputs (via input devices 1212), and for providing various outputs (via output devices 1214). Illustrative input devices include a keyboard device, a mouse input device, a touchscreen input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), and so on. One particular output mechanism may include a display device 1216 and an associated graphical user interface presentation (GUI) 1218. The display device 1216 may correspond to a charge-coupled display device, a cathode ray tube device, a projection mechanism, etc. Other output devices include a printer, a model-generating mechanism, a haptic output mechanism, an archival mechanism (for storing output information), and so on. The computing functionality 1202 can also include one or more network interfaces 1220 for exchanging data with other devices via one or more communication conduits 1222. One or more communication buses 1224 communicatively couple the above-described components together.

The communication conduit(s) 1222 can be implemented in any manner, e.g., by a local area computer network, a wide area computer network (e.g., the Internet), point-to-point connections, etc., or any combination thereof. The communication conduit(s) 1222 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1202 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself.

The following summary provides a non-exhaustive list of illustrative aspects of the technology set forth herein.

According to a first aspect, a system, implemented by one or more computing devices, is described for processing a linguistic item. The linguistic item corresponds to information expressed in a natural language. The system includes an interface component that is configured to receive a linguistic item from a particular device-implemented endpoint mechanism, in response to interaction by a user with an input device associated with the particular endpoint mechanism. The particular endpoint mechanism corresponds to one of a set of different types of endpoint mechanisms. The system further includes an endpoint-independent subsystem for interpreting the linguistic item in a manner that is independent of the particular endpoint mechanism from which the linguistic item originated, the endpoint-independent subsystem generating first intermediate results. The system further includes an endpoint-dependent subsystem for interpreting the linguistic item in a manner that is dependent on the particular endpoint mechanism from which the linguistic item originated, the endpoint-dependent subsystem generating second intermediate results. The system further includes a ranking component configured to generate final interpretation results based on the first intermediate results and the second intermediate results. The final interpretation results represent an interpretation of a meaning of the input linguistic item.

According to a second aspect, the particular endpoint mechanism corresponds to a particular type of user computing device through which the user enters the linguistic item.

According to a third aspect, the particular endpoint mechanism corresponds to a program component through which the user enters the linguistic item, as implemented by a computing device.

According to a fourth aspect, the above-referenced program component corresponds to a browser component or a messaging flow component.

According to a fifth aspect, the endpoint-independent subsystem includes one or more endpoint-independent interpreter components. Further, the endpoint-dependent subsystem includes one or more endpoint-dependent interpreter components. Each endpoint-independent interpreter component is configured to interpret linguistic items directed to a particular domain, in a manner that is independent of endpoint mechanisms from which the linguistic items originated. Each endpoint-dependent interpreter component is configured to interpret linguistic items directed to a particular domain, in a manner that is dependent on endpoint mechanisms from which the linguistic items originated.

According to a sixth aspect, one particular endpoint-independent or endpoint-dependent interpreter component includes a domain determination component configured to determine whether the linguistic item that has been received corresponds to a particular domain.

According to a seventh aspect, one particular endpoint-independent or endpoint-dependent interpreter component includes an intent determination component configured to determine an intent associated with the linguistic item.

According to an eighth aspect, one particular endpoint-independent or endpoint-dependent interpreter component includes a slot value determination component configured to extract one or more slot values from the linguistic item.

According to a ninth aspect, one or more endpoint-dependent interpreter components associated with the endpoint-dependent subsystem generate one or more instances of interpreter results. The endpoint-dependent subsystem further includes a post-processing component configured to filter the interpreter results based on endpoint information that identifies the particular endpoint mechanism that has been used to provide the linguistic item.

According to a tenth aspect, the ranking component identifies a candidate interpretation result (CIR) item considered to be a most likely interpretation of the linguistic item, selected from among the first intermediate results and the second intermediate results. The ranking component identifies the CIR item based at least on endpoint information that identifies the particular endpoint mechanism that has been used to provide the linguistic item.

According to an eleventh aspect, the endpoint-independent subsystem and/or the endpoint-dependent subsystem and/or the ranking component is implemented, at least in part, using one or more machine-learned models.

According to a twelfth aspect, the endpoint-independent subsystem and/or the endpoint-dependent subsystem and/or the ranking component is implemented, at least in part, using one or more rule-application engines.

According to a thirteenth aspect, an action-taking component is configured to perform a computer-implemented action in response to the final interpretation results.

According to a fourteenth aspect, a method is provided, implemented by one or more computing devices, for processing a linguistic item. The linguistic item corresponds to information expressed in a natural language. The method includes receiving a linguistic item from at a device-implemented endpoint mechanism, in response to interaction by a user with an input device associated with the particular endpoint mechanism. The particular endpoint mechanism corresponds to one of a set of different types of endpoint mechanisms. The method further includes processing the linguistic item by a language understanding (LU) system to generate final interpretation results. The LU system includes: an endpoint-independent subsystem for interpreting the linguistic item in a manner that is independent of the particular endpoint mechanism from which the linguistic item originated, to generate first intermediate results; and an endpoint-dependent subsystem for interpreting the linguistic item in a manner that is dependent on the particular endpoint mechanism, to generate second intermediate results. The method further includes performing a computer-implemented action in response to the final interpretation results.

According to a fifteenth aspect, the particular endpoint mechanism (mentioned in the above fourteenth aspect) corresponds to a particular type of user computing device and/or a program component through which the user enters the linguistic item.

According to a sixteenth aspect, the LU system (mentioned in the above fourteenth aspect) further includes a ranking component configured to generate final interpretation results based on the first intermediate results and the second intermediate results.

According to a seventeenth aspect, the endpoint-independent subsystem (mentioned in the above sixteenth aspect) includes one or more endpoint-independent interpreter components. Further, the endpoint-dependent subsystem (mentioned in the above sixteenth aspect) includes one or more endpoint-dependent interpreter components. Each endpoint-independent interpreter component is configured to interpret linguistic items directed to a particular domain, in a manner that is independent of endpoint mechanisms from which the linguistic items originated. Each endpoint-dependent interpreter component is configured to interpret linguistic items directed to a particular domain, in a manner that is dependent on endpoint mechanisms from which the linguistic items originated.

According to an eighteenth aspect, the method further includes an operation of accommodating a new endpoint mechanism or application without affecting at least one existing interpreter component of the LU system.

According to a nineteenth aspect, a computer-readable storage medium is described for storing computer-readable instructions. The computer-readable instructions, when executed by one or more processor devices, provide a language understanding (LU) system. The LU system includes an endpoint-independent subsystem configured to interpret a linguistic item in a manner that is independent of a particular device-implemented endpoint mechanism from which the linguistic item has been received, the endpoint-independent subsystem generating first intermediate results. (The linguistic item corresponds to information expressed in a natural language.) The endpoint-independent subsystem itself includes one or more endpoint-independent interpreter components. Each endpoint-independent interpreter component is configured to interpret linguistic items directed to a particular domain, in a manner that is independent of the particular endpoint mechanisms from which the linguistic items originated. The system further includes an endpoint-dependent subsystem configured to interpret the linguistic item in a manner that is dependent on the particular endpoint mechanism, the endpoint-dependent subsystem generating second intermediate results. The endpoint-dependent subsystem itself includes one or more endpoint-dependent interpreter components. Each endpoint-dependent interpreter component is configured to interpret linguistic items directed to a particular domain, in a manner that is dependent on the particular endpoint mechanisms from which the linguistic items originated. The system further includes a ranking component configured to identify a candidate interpretation result (CIR) item that is considered to be a most likely interpretation of the linguistic item, selected from among the first intermediate results and the second intermediate results.

According to a twentieth aspect, the particular endpoint mechanism (mentioned in the nineteenth aspect) corresponds to a particular type of user computing device and/or a program component through which the user enters the linguistic item.

A twenty-first aspect corresponds to any combination (e.g., any permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A system comprising:
a processing device; and
a storage resource storing instructions which, when executed by the processing device, cause the processing device to:

receive text-based or voice-recognized words input by a user to a particular physical device;
interpret the text-based or voice-recognized words in a manner that is independent of the particular physical device to obtain a device-independent candidate meaning for the text-based or voice-recognized words, the device-independent candidate meaning being applicable to a plurality of different physical devices;
interpret the text-based or voice-recognized words in a manner that is dependent on the particular physical device to obtain a device-dependent candidate meaning for the text-based or voice-recognized words;
generate final interpretation results by ranking the device-independent candidate meaning for the text-based or voice-recognized words relative to the device-dependent candidate meaning for the text-based or voice-recognized words and selecting one of the device-independent candidate meaning or the device-dependent candidate meaning as the final interpretation results; and
output the final interpretation results.

2. The system of claim 1, wherein the instructions, when executed by the processing device, cause the processing device to:
calculate a first score for the device-independent candidate meaning, the first score reflecting a first likelihood that the device-independent candidate meaning is the true meaning of the text-based or voice-recognized words;
calculate a second score for the device-dependent candidate meaning, the second score reflecting a second likelihood that the device-dependent candidate meaning is the true meaning of the text-based or voice-recognized words; and
rank the device-independent candidate meaning relative to the device-dependent candidate meaning based at least on the first score and the second score.

3. The system of claim 2, wherein the instructions, when executed by the processing device, cause the processing device to:
select the device-independent candidate meaning for the final interpretation results in an instance when the first score exceeds the second score; and
select the device-dependent candidate meaning for the final interpretation results in another instance when the second score exceeds the first score.

4. The system of claim 1, provided on a server located remotely from the particular physical device.

5. The system of claim 1, wherein the instructions, when executed by the processing device, cause the processing device to:
use a device-independent interpreter component to interpret the text-based or voice-recognized words with respect to a particular domain and output the device-independent candidate meaning; and
use a device-dependent interpreter component to interpret the text-based or voice-recognized words with respect to another domain and output the device-dependent candidate meaning.

6. The system of claim 5, wherein the device-independent interpreter component or the device-dependent interpreter component includes a corresponding domain determination component configured to determine a respective domain for the text-based or voice-recognized words.

7. The system of claim 5, wherein the device-independent interpreter component or the device-dependent interpreter component includes an intent determination component configured to determine an intent associated with the text-based or voice-recognized words.

8. The system of claim 5, wherein the device-independent interpreter component or the device-dependent interpreter component includes a slot value determination component configured to extract one or more slot values for individual words.

9. The system of claim 5, wherein the instructions, when executed by the processing device, cause the processing device to:
filter interpreter results produced by the device-dependent interpreter component based at least on device information that identifies the particular physical device that has been used to provide the text-based or voice-recognized words.

10. The system of claim 1, wherein the instructions, when executed by the processing device, cause the processing device to:
determine different probability values for the device-independent candidate meaning for the text-based or voice-recognized words and the device-dependent candidate meaning for the text-based or voice-recognized words; and
select, as the final interpretation results, a particular candidate meaning having the highest probability.

11. The system of claim 1, wherein the instructions, when executed by the processing device, cause the processing device to:
use one or more machine-learned models to obtain the device-independent candidate meaning, the device-dependent candidate meaning, or the final interpretation results.

12. The system of claim 1, wherein the instructions, when executed by the processing device, cause the processing device to:
use one or more rule-application engines to obtain the device-independent candidate meaning, the device-dependent candidate meaning, or the final interpretation results.

13. The system of claim 1, wherein the instructions, when executed by the processing device, cause the processing device to
cause a computer-implemented action specified by the final interpretation results.

14. A method implemented by one or more computing devices, the method comprising:
receiving one or more voice-recognized or text-based words provided by a particular device in response to interaction by a user with an input device associated with the particular device; and
processing the one or more words by:
interpreting the one or more voice-recognized or text-based words using a device-independent interpreter that outputs a first candidate command conveyed by the one or more voice-recognized or text-based words without considering the particular device that provided the one or more voice-recognized or text-based words;
interpreting the one or more voice-recognized or text-based words using a device-dependent interpreter that outputs a second candidate command conveyed by the one or more voice-recognized or text-based words by explicitly considering the particular device that provided the one or more voice-recognized or text-based words;

determining respective likelihood scores for the first candidate command output by the device-independent interpreter and the second candidate command output by the device-dependent interpreter;

based at least on the respective likelihood scores, selecting a selected command from the first candidate command and the second candidate command; and performing a computer-implemented action in response to the selected command.

15. The method of claim 14, further comprising:

considering hardware capabilities of the particular device when interpreting the one or more voice-recognized or text-based words using the device-dependent interpreter.

16. The method of claim 14, further comprising:

ranking the first candidate command relative to the second candidate command based at least on the respective likelihood scores; and selecting the selected command based at least on the ranking.

17. The method of claim 14, wherein the device-independent interpreter and the device-dependent interpreter are configured to perform word interpretation with respect to different domains.

18. The method of claim 17, wherein the first candidate command involves searching for a hotel and the second candidate command involves playing a media item.

19. A computer-readable storage medium storing computer-readable instructions which, when executed by one or more processor devices, cause the one or more processor devices to perform acts comprising:

interpreting a specific sequence of words in a device-independent manner that is independent of a particular device from which the specific sequence of words has been received to obtain a device-independent candidate meaning of the specific sequence of words;

interpreting the specific sequence of words in a device-dependent manner that is dependent on the particular device from which the specific sequence of words has been received to obtain a device-dependent candidate meaning of the specific sequence of words that is different from the device-independent candidate meaning;

performing a comparison of respective probability values for the device-independent candidate meaning and the device-dependent candidate meaning; and based at least on the comparison, identifying a candidate interpretation result item that is a most likely interpretation of the specific sequence of words, the candidate interpretation result item being selected from among the device-independent candidate meaning and the device-dependent candidate meaning.

20. The computer-readable storage medium of claim 19, wherein interpreting the specific sequence of words in the device-independent manner does not consider hardware capabilities of the particular device, and interpreting the specific sequence of words in the device-dependent manner explicitly considers the hardware capabilities of the particular device.

* * * * *